United States Patent
Kuo et al.

(10) Patent No.: US 12,340,764 B2
(45) Date of Patent: Jun. 24, 2025

(54) ELECTRONIC DEVICE

(71) Applicant: InnoLux Corporation, Miao-Li County (TW)

(72) Inventors: Chien-Hao Kuo, Miao-Li County (TW); Yu-Jyun Lyu, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/391,544

(22) Filed: Dec. 20, 2023

(65) Prior Publication Data
US 2024/0233655 A1  Jul. 11, 2024

(30) Foreign Application Priority Data
Jan. 9, 2023 (CN) .......................... 202310027352.5

(51) Int. Cl.
*G09G 3/34* (2006.01)
*G02F 1/133* (2006.01)
*G09G 3/36* (2006.01)

(52) U.S. Cl.
CPC ....... *G09G 3/3406* (2013.01); *G02F 1/13306* (2013.01); *G09G 3/3611* (2013.01); *G09G 2320/0257* (2013.01); *G09G 2330/021* (2013.01); *G09G 2330/025* (2013.01)

(58) Field of Classification Search
CPC ................................................. G09G 2310/08
See application file for complete search history.

(56) References Cited

U.S. PATENT DOCUMENTS

| 2004/0041760 A1* | 3/2004 | Tsumura | G09G 3/3648 345/87 |
| 2007/0229444 A1* | 10/2007 | Liu | G09G 3/3413 345/102 |
| 2020/0211481 A1* | 7/2020 | Lee | G09G 3/3406 |

FOREIGN PATENT DOCUMENTS

WO    2020/192351 A1    10/2020

* cited by examiner

*Primary Examiner* — Nan-Ying Yang
(74) *Attorney, Agent, or Firm* — Winston Hsu (57) ABSTRACT

An electronic device including a display module and a backlight module is disclosed. The display module includes a display charging period and a liquid crystal rotating period in one frame. The backlight module is configured to provide a light source to the display module, and the backlight module includes a backlight driving period corresponding to one frame of the display module. A portion of the backlight driving period of an $N^{th}$ frame is overlapped with the display charging period of an $(N+1)^{th}$ frame, and N is a positive integer.

13 Claims, 8 Drawing Sheets

ELECTRONIC DEVICE

BACKGROUND OF THE DISCLOSURE

1. Field of the Disclosure

The present disclosure relates to an electronic device, and more particularly to an electronic device including a display module and a backlight module.

2. Description of the Prior Art

In recent years, liquid crystal display modules are widely used in electronic devices such as liquid crystal displays (LCD) and virtual reality (VR) devices, which can display images through the architecture of a liquid crystal panel and a backlight module. However, if the backlight is turned on when the liquid crystals react, it may cause problems such as image persistence or rough edges of the images, thereby leading to poor visual effect of displaying. If the backlight is turned on after the liquid crystals react in order to avoid the reaction time of liquid crystals, the turning on of the backlight is limited to a very short time, resulting in the problems of high instantaneous current and high power consumption.

SUMMARY OF THE DISCLOSURE

One of objectives of the present disclosure is to provide an electronic device, so as to solve the problems encountered by the conventional electronic devices, and reduce the power consumption and improve the image display quality through the cooperation of the display module and the backlight module, thereby balancing the power consumption and the visual effect of displaying of the electronic device.

An embodiment of the present disclosure provides an electronic device. The electronic device includes a display module and a backlight module. The display module includes a display charging period and a liquid crystal rotating period in one frame. The backlight module is configured to provide a light source to the display module, and the backlight module includes a backlight driving period corresponding to one frame of the display module. A portion of the backlight driving period of an $N^{th}$ frame is overlapped with the display charging period of an $(N+1)^{th}$ frame, and N is a positive integer.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the device, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include", "comprise" and "have" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or addition of one or a plurality of the corresponding or other features, areas, steps, operations, components and/or combinations thereof.

When an element or layer is referred to as being "on" or "connected to" another element or layer, it may be directly on or directly connected to the other element or layer, or intervening elements or layers may be presented (indirect condition). In contrast, when an element is referred to as being "directly on" or "directly connected to" another element or layer, there are no intervening elements or layers presented. When an element is referred to be "coupled to" another element, it may be directly connected to the other element, or indirectly connected (e.g., electrically connected) to the other element through one or more elements.

The directional terms mentioned in this document, such as "up", "down", "front", "back", "left", "right", etc., are only directions referring to the drawings. Therefore, the directional terms used are for illustration, not for limitation of the present disclosure.

The term "about", "substantially" or "approximately" mentioned in this document generally mean being within 10% of a given value or range, or being within 5%, 3%, 2%, 1% or 0.5% of a given value or range.

The ordinal numbers used in the description and claims, such as "first", "second", "third", etc., are used to describe elements, but they do not mean and represent that the element(s) have any previous ordinal numbers, nor do they represent the order of one element and another element, or the order of manufacturing methods. The ordinal numbers are used only to clearly discriminate an element with a certain name from another element with the same name. The claims and the description may not use the same terms. Accordingly, in the following description, a first constituent element may be a second constituent element in a claim.

The electronic device of the present disclosure may include a display device, a backlight device, a virtual reality device, an augmented reality device, an antenna device, a sensing device or a tiled device, but not limited herein. The electronic device may include a bendable or flexible electronic device. The display device may include a non-self-emissive display device or a self-emissive display device. The antenna device may include a liquid-crystal type antenna device or an antenna device other than liquid-crystal type, and the sensing device may include a sensing device used for sensing capacitance, light, heat or ultrasonic waves, but not limited herein. The electronic device may include electronic elements such as passive elements and active elements, for example, capacitors, resistors, inductors, diodes, transistors, etc. The diode may include a light-emitting diode or a photodiode. For example, the light-emitting diode may include an inorganic light-emitting diode, an organic light-emitting diode (OLED), a mini light-emitting diode (mini LED), a micro light-emitting diode (micro LED) or a quantum dot light-emitting diode (quantum dot LED), but not limited herein. The tiled device may be, for example, a display tiled device or an antenna tiled device, but not limited herein. It should be noted that the electronic device may be any arrangement and combination of the above, but not limited herein.

It should be noted that the technical features in different embodiments described in the following can be replaced, recombined, or mixed with one another to constitute another embodiment without departing from the spirit of the present disclosure.

Figure 1:
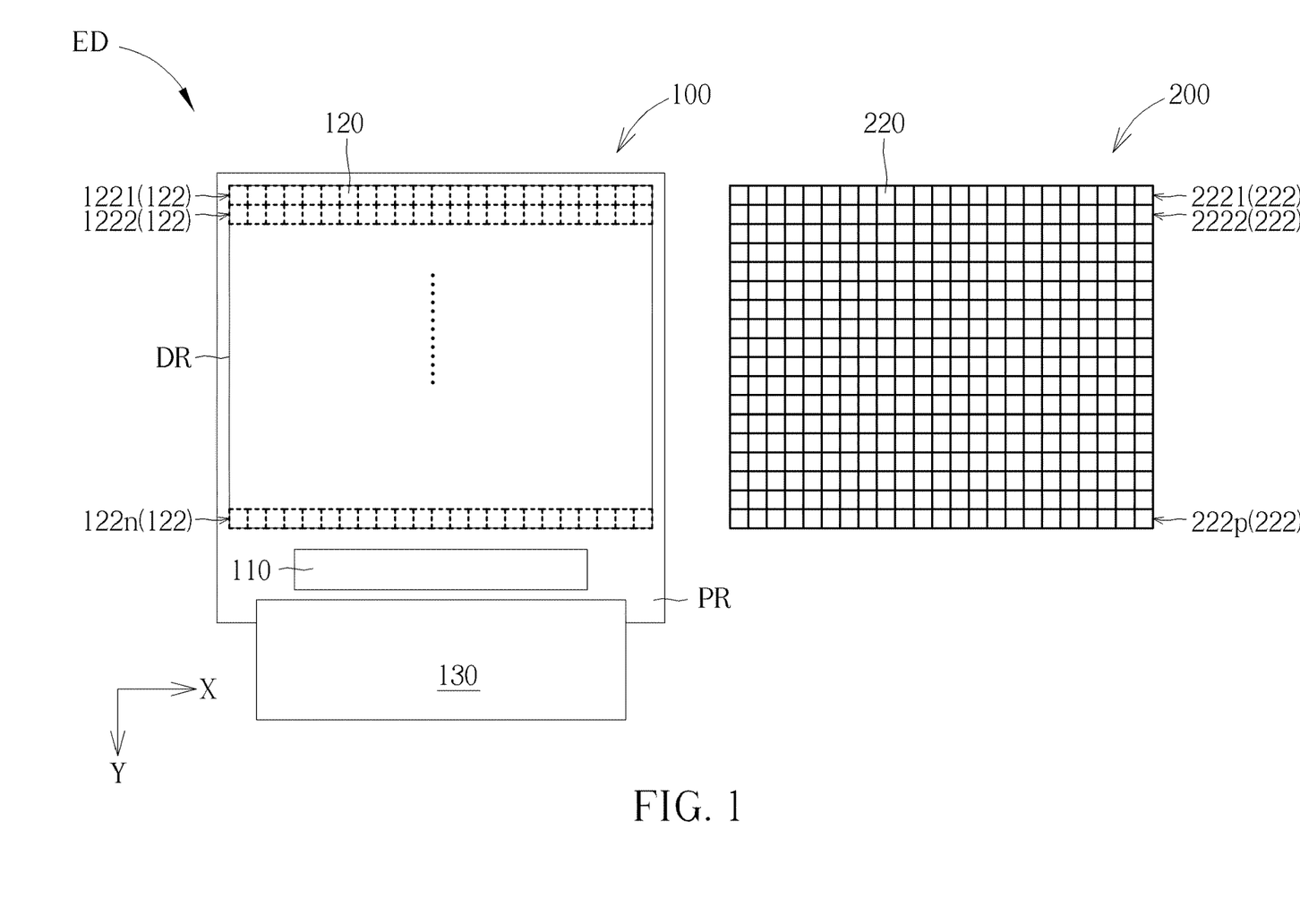
FIG. 1 is a top-view schematic diagram of the architecture of a display module and a backlight module of an electronic device according to an embodiment of the present disclosure.
Figure 2:
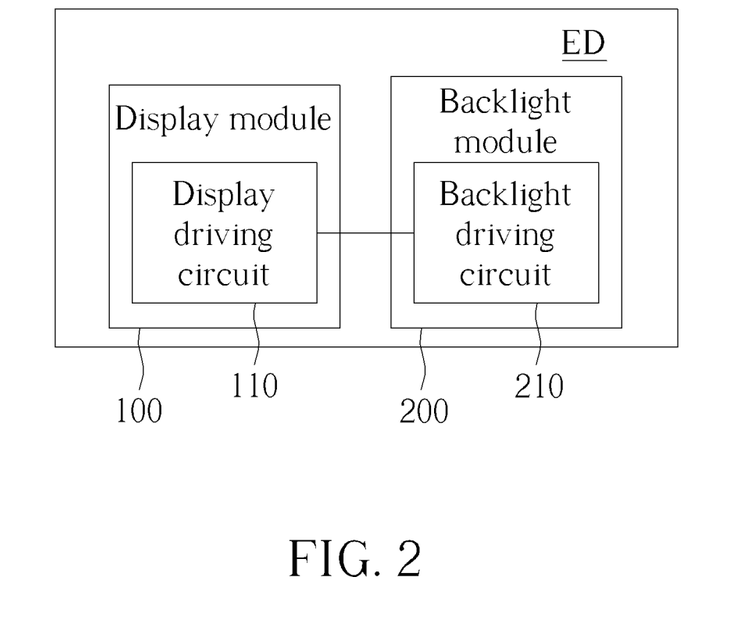
FIG. 2 is a functional block schematic diagram of the elements of an electronic device according to an embodiment of the present disclosure.
Figure 3:
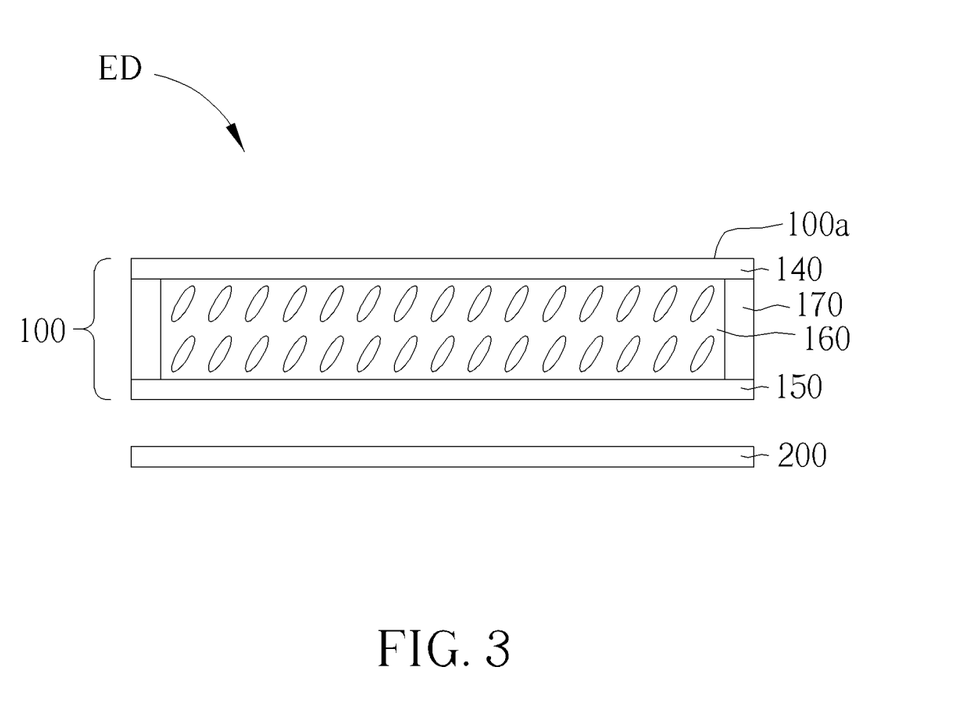
FIG. 3 is a cross-sectional schematic diagram of the structure of an electronic device according to an embodiment of the present disclosure.

Please refer to FIG. 1, FIG. 2 and FIG. 3. FIG. 1 is a top-view schematic diagram of the architecture of a display module and a backlight module of an electronic device according to an embodiment of the present disclosure. It should be noted that in order to show the top-view structures of the display module and the backlight module at the same time, the display module and the backlight module are shown side by side in FIG. 1, but the display module and the backlight module are overlapped with each other in the structure of the electronic device in practice. FIG. 2 is a functional block schematic diagram of the elements of an electronic device according to an embodiment of the present disclosure. FIG. 3 is a cross-sectional schematic diagram of the structure of an electronic device according to an embodiment of the present disclosure. As shown in FIG. 1 and FIG. 2, an electronic device ED according to an embodiment of the present disclosure includes a display module 100 and a backlight module 200. The backlight module 200 is disposed opposite to the display module 100 and configured to provide a light source to the display module 100. For example, the backlight module 200 may be disposed on a side of the display module 100 opposite to a display surface 100a of the display module 100, that is, on the back side of the display module 100, as shown in FIG. 3. The display module 100 may include, for example (but not limited to), a liquid crystal display panel, which is configured to display images. The display module 100 has a display region DR and a peripheral region PR adjacent to the display region DR. For example, the peripheral region PR may be located around or on at least on one side of the display region DR. The display module 100 may include a display driving circuit 110 disposed in the peripheral region PR. Furthermore, the display module 100 may include a plurality of pixels 120, for example, disposed with an array arrangement of a plurality of rows and columns in the display region DR for displaying images. The display driving circuit 110 may be coupled to the pixels 120. For example, the display driving circuit 110 may be coupled to a switching transistor and/or a driving transistor of each pixel 120 or each sub-pixel of the pixels 120, wherein the transistor may include, for example (but not limited to), a thin film transistor (TFT). The pixels 120 in the display region DR may be divided into a plurality of pixel regions 122, and each of the pixel regions 122 extends along the direction X and includes at least one row of pixels 120. In FIG. 1, as an example, each of the pixel regions 122 includes one row of pixels 120, but not limited herein. Furthermore, the plurality of pixel regions 122 are arranged side by side in sequence in the direction Y. The direction X may be perpendicular to the direction Y, for example, but not limited herein. In some embodiments, the display module 100 may further include a circuit board 130, at least a portion of the circuit board 130 may be disposed in the peripheral region PR, and the circuit board 130 may be coupled to the display driving circuit 110 and further coupled to the pixels 120 in the display region DR. For example, the display driving circuit 110 and at least a portion of the circuit board 130 may be disposed in the peripheral region PR located at one side (e.g. the lower side) of the display region DR, but not limited herein.

The operation method of the display module 100 in the embodiment of the present disclosure may be, for example, charging the pixels 120 of the pixel regions 122 line by line from the upper side to the lower side along the direction Y in sequence, so that the plurality of pixel regions 122 in the display module 100 may include a pixel region 1221 located at the uppermost side which is operated as a first region, a pixel region 1222 which is operated as a second region, . . . to a pixel region 122n located at the lowermost side which is operated as an $n^{th}$ region, but not limited herein.

The backlight module 200 may generate a light source, serving as a backlight source required by the display module 100 when displaying images, wherein the backlight module 200 may include, for example (but not limited to), a scanning backlight module. The backlight module 200 may include a backlight driving circuit 210, and the display driving circuit 110 may be coupled to the backlight driving circuit 210. Furthermore, the backlight module 200 may include a plurality of light-emitting elements 220, which may be, for example (but not limited to), light-emitting diodes (LEDs). The light-emitting diode may include, for example, an inorganic light-emitting diode, an organic light-emitting diode (OLED), a mini light-emitting diode (mini LED), a micro light-emitting diode (micro LED) or a quantum dot light-emitting diode (quantum dot LED), but not limited herein. The plurality of light-emitting elements 220 of the backlight module 200 may be divided into a plurality of light-emitting regions 222, and each of the light-emitting regions 222 extends along the direction X and includes at least one row of light-emitting elements 220. In FIG. 1, as an example, each of the light-emitting regions 222 includes one row of light-emitting elements 220, but not limited herein. Furthermore, the plurality of light-emitting regions 222 are arranged side by side in sequence in the direction Y.

The operation method of the backlight module 200 in the embodiment of the present disclosure may be, for example, turning on the light-emitting elements 220 of the light-emitting regions 222 line by line from the upper side to the lower side along the direction Y in sequence, so that the plurality of light-emitting regions 222 in the backlight module 200 may include a light-emitting region 2221 located at the uppermost side which is operated as a first region, a light-emitting region 2222 which is operated as a second region, . . . to a light-emitting region $222p$ located at the lowermost side which is operated as a $p^{th}$ region, but not limited herein, wherein p may be the same as or different from n. Each of the light-emitting regions 222 in the backlight module 200 may correspond to at least one pixel region 122 in the display module 100. For example, one light-emitting region 222 may correspond to one pixel region 122 when p=n, while one light-emitting region 222 may correspond to a plurality of pixel regions 122 when p≠n or p<n. The following embodiments are illustrated with the condition that p=n, but the structural design of the electronic device ED of the present disclosure is not limited herein.

The structure and relationship of relative positions of the display module 100 and the backlight module 200 may be referred to FIG. 3, for example. The display module 100 may include a first substrate 140, a second substrate 150 and a liquid crystal layer 160. The second substrate 150 is located at a side of the display module 100 closer to the backlight module 200, and the liquid crystal layer 160 is located between the first substrate 140 and the second substrate 150. The display module 100 may further include a sealant 170, and the liquid crystal layer 160 may be surrounded and sealed between the first substrate 140 and the second substrate 150 through the sealant 170. The upper surface of the first substrate 140 may be used as the display surface 100a of the display module 100, for example, and the backlight module 200 is disposed on a side opposite to the display surface 100a, that is, the backlight module 200 is used as a direct backlight module in the embodiment shown in FIG. 3. The first substrate 140 and the second substrate 150 may respectively include hard materials and/or flexible materials, such as glass, a quartz substrate, polyimide (PI), polyethylene terephthalate (PET), other suitable materials or combinations of the above materials, but not limited herein. FIG. 3 only shows one of the examples of the electronic device ED of the present disclosure, and the structural design of the electronic device ED of the present disclosure is not limited to the above.

Figure 4:
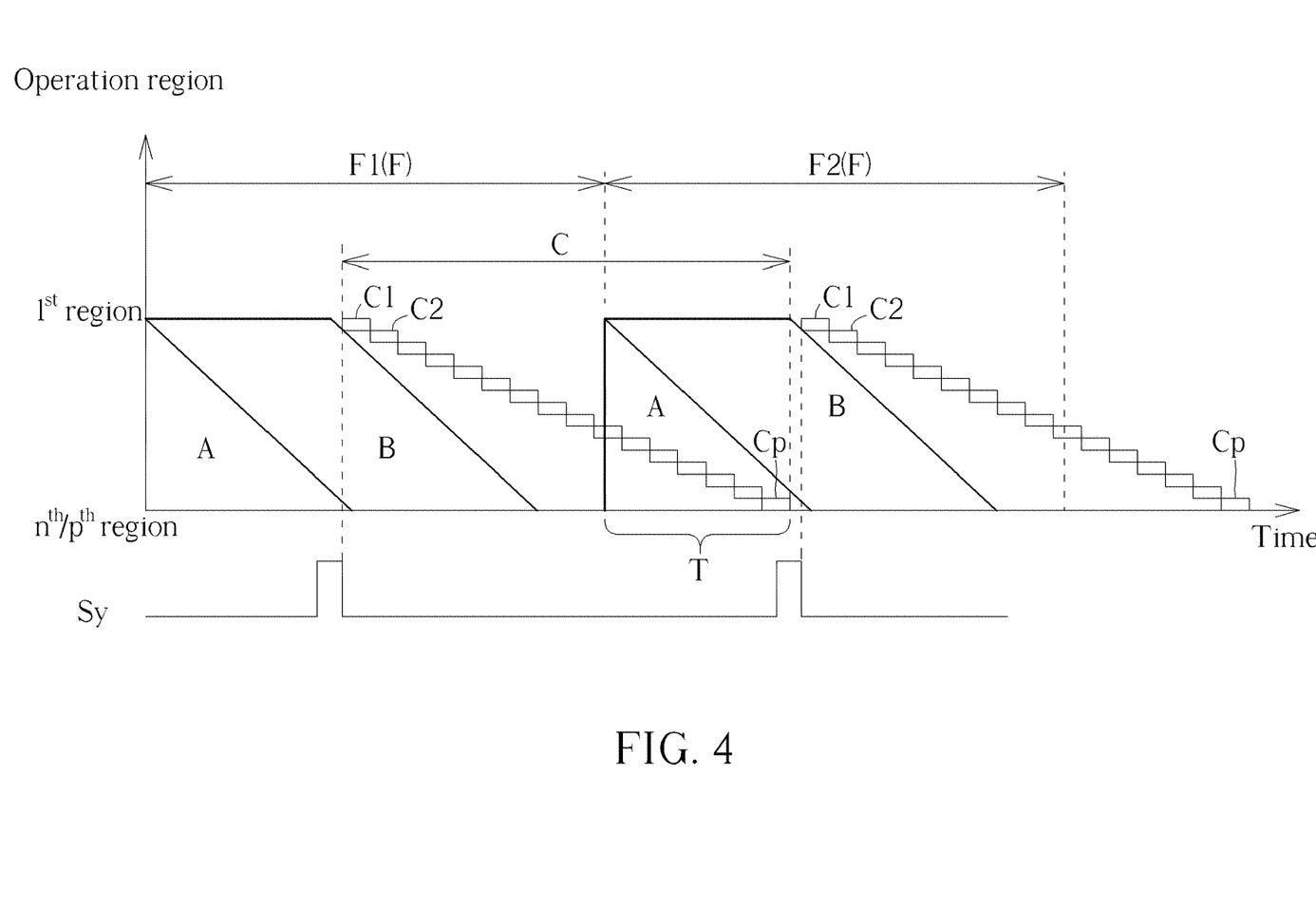
FIG. 4 is a timing diagram of driving of an electronic device according to a first embodiment of the present disclosure.
Figure 5:
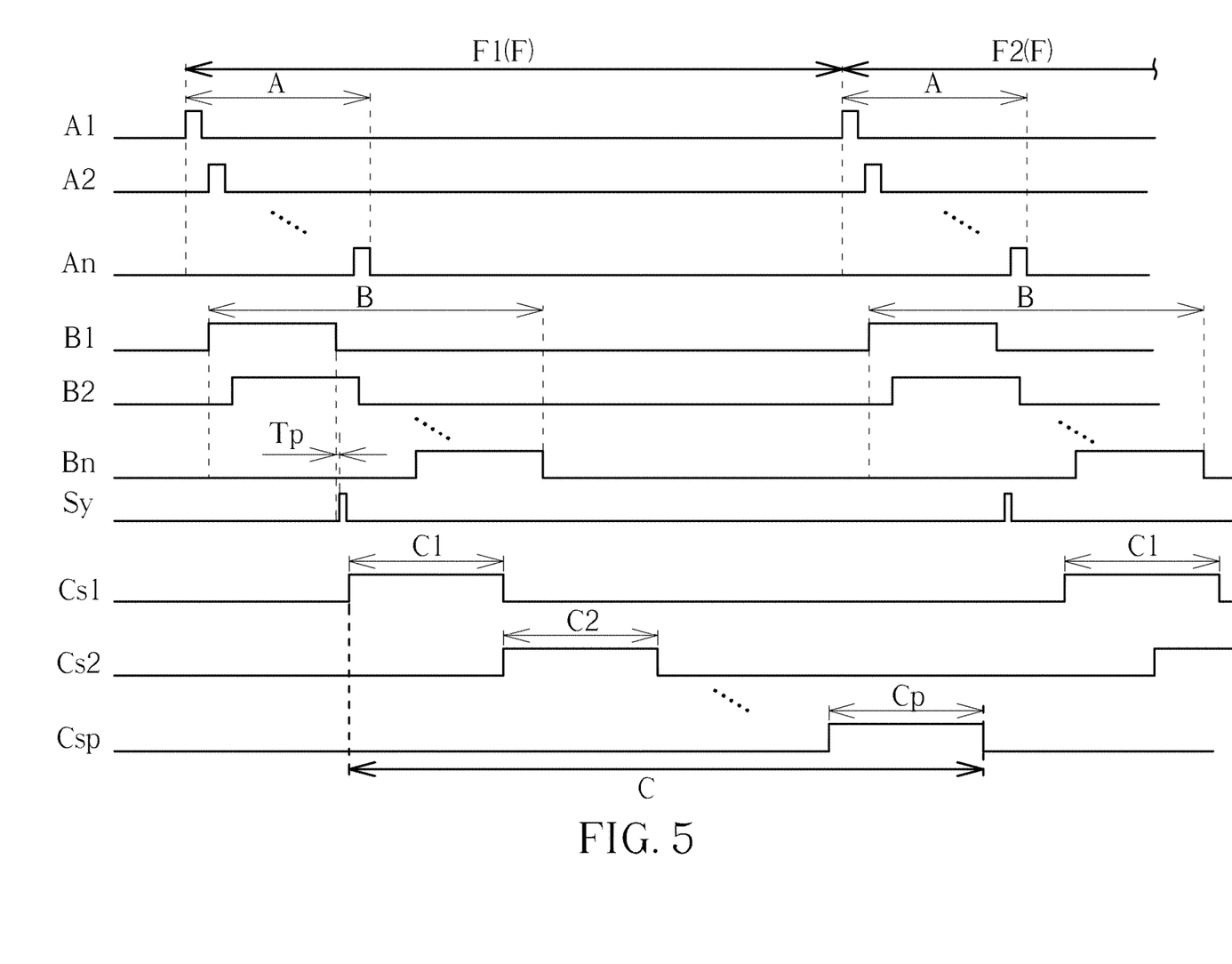
FIG. 5 is a signal sequence diagram of an electronic device according to a first embodiment of the present disclosure.

Please refer to FIG. 4 and FIG. 5, accompanied with FIG. 1 and FIG. 2. FIG. 4 is a timing diagram of driving of an electronic device according to a first embodiment of the present disclosure, which shows the individual operation of the pixel regions and light-emitting regions in the display module and the backlight module. FIG. 5 is a signal sequence diagram of an electronic device according to a first embodiment of the present disclosure. As shown in FIG. 4 and FIG. 5, according to the electronic device ED of the embodiment of the present disclosure, the display module 100 includes a display charging period A and a liquid crystal rotating period B in one frame F, and the backlight module 200 includes a backlight driving period C corresponding to one frame F of the display module 100. Furthermore, a portion of the backlight driving period C of an $N^{th}$ frame is overlapped with the display charging period A of an $(N+1)^{th}$ frame, wherein N is a positive integer greater than or equal to 1. The term "one frame F" referred in the present disclosure may mean the period time (also called as cycle time) from the start of charging to the time before the next charging of the pixels 120 of the display module 100, wherein a frame may also be referred to as a frame period or a frame time, and one frame=1/(a frame rate of the display module 100). For example, the frame rate of the display module 100 may be 120 Hz, 90 Hz or 60 Hz, and the corresponding one frame time thereof may be $\frac{1}{120}$ seconds (s), $\frac{1}{90}$ seconds or $\frac{1}{60}$ seconds, but not limited herein. During the display charging period A, the pixels 120 of the plurality of pixel regions 122 of the display module 100 may be charged in sequence by regions. During the liquid crystal rotating period B, the liquid crystals corresponding to each of the pixel regions 122 may rotate. For example, after the pixels 120 of one of the pixel regions 122 are charged, the liquid crystals corresponding to this pixel region 122 can rotate, but not limited herein. During the backlight driving period C, the light-emitting elements 220 of the light-emitting regions 222 may be turned on by regions, wherein the backlight driving period C may correspond to 5% to 100% of one frame F, for example, but not limited herein.

As shown in FIG. 4, the operation regions represented by the display charging period A and the liquid crystal rotating period B according to the vertical axis, from the top to the bottom of which may represent the operation state of each region of the display region DR of the display module 100 from the top to the bottom along the Y axis in FIG. 1. Specifically, in one frame F, the uppermost portion of the display charging period A according to the vertical axis of FIG. 4 may represent that the pixels 120 in the pixel region 1221 of the first region are charged, which may correspond to a first region charging signal A1 shown in FIG. 5, while the lowermost portion of the display charging period A according to the vertical axis of FIG. 4 may represent that the pixels 120 in the pixel region $122n$ of the $n^{th}$ region are charged, which may correspond to an $n^{th}$ region charging signal An shown in FIG. 5. Reasoning by analogy, for example, the charging of the pixels 120 in the pixel region 1222 of the second region may correspond to a second region charging signal A2 shown in FIG. 5. Furthermore, in one frame F, the uppermost portion of the liquid crystal rotating period B according to the vertical axis of FIG. 4 may represent that the liquid crystals corresponding to the pixel region 1221 of the first region rotates, which may correspond to a first region liquid crystal reacting signal B1 shown in FIG. 5, while the lowermost portion of the liquid crystal rotating period B according to the vertical axis of FIG. 4 may represent that the liquid crystals corresponding to the pixel region $122n$ of the $n^{th}$ region rotates, which may correspond to an $n^{th}$ region liquid crystal reacting signal Bn shown in FIG. 5. Reasoning by analogy, for example, the rotating of the liquid crystals corresponding to the pixel region 1222 of the second region may correspond to a second region liquid crystal reacting signal B2 shown in FIG. 5.

As shown in FIG. 4, the backlight driving period C according to the vertical axis from the top to the bottom may represent the operation state of each region of the backlight module 200 from the top to the bottom along the Y axis in FIG. 1. For example, a sub-period C1 which is the uppermost of the backlight driving period C according to the vertical axis of FIG. 4 may represent that the light-emitting elements 220 in the light-emitting region 2221 of the first region are turned on, which may correspond to a first region backlight driving signal Cs1 shown in FIG. 5, wherein the light-emitting region 2221 of the first region may for example, correspond to the pixel region 1221 of the first region. While a sub-period Cp which is the lowermost of the backlight driving period C according to the vertical axis of FIG. 4 may represent that the light-emitting elements 220 in the light-emitting region $222p$ of the $p^{th}$ region are turned on, which may correspond to a $p^{th}$ region backlight driving signal Csp shown in FIG. 5, wherein the light-emitting region 222p of the $p^{th}$ region may for example, correspond to the pixel region 122n of the $n^{th}$ region. Reasoning by analogy, for example, a sub-period C2 of the backlight driving period C may represent that the light-emitting elements 220 in the light-emitting region 2222 of the second region are turned on, which may correspond to a second region backlight driving signal Cs2 shown in FIG. 5. Therefore, the light-emitting regions 222 of each region scan and are turned on in sequence from the top to the bottom from the first region to the $p^{th}$ region, and the above backlight driving signals Cs1 to Csp can also be regarded as backlight scanning commands. In some embodiments, when p<n, one light-emitting region 222 may correspond to a plurality of pixel regions 122, for example, corresponding to m pixel regions 122, wherein m is an integer greater than 1. Thus, after the pixels 120 in the pixel regions 122 from the first region to the $m^{th}$ region are charged, the corresponding light-emitting region 2221 of the first region can be turned on, and after the pixels 120 in the pixel regions 122 from the $(m+1)^{th}$ region to the $(2m)^{th}$ region are charged, the corresponding light-emitting region 2222 of the second region can be turned on, and so on.

According to the embodiment of the present disclosure, the display driving circuit 110 of the display module 100 may provide a synchronization signal Sy to the backlight driving circuit 210 of the backlight module. When the backlight driving circuit 210 receives the synchronization signal Sy, the backlight module 200 starts to operate and enters the backlight driving period C including the sub-period C1 to sub-period Cp, that is, the light-emitting elements 220 in the light-emitting regions 2221 of the first region to the light-emitting elements 220 in the light-emitting region 222p of the $p^{th}$ region are turned on in sequence. Furthermore, a portion of the backlight driving period C corresponding to one frame F (e.g., an $N^{th}$ frame F1) is overlapped with the display charging period A of the next frame F (e.g., an $(N+1)^{th}$ frame F2). For example, at least the sub-period Cp of the backlight driving period C of one frame F1 may be overlapped with the display charging period A of the next frame F2. The portion of the backlight driving period C overlapped with the display charging period A may be labeled as an overlapping time T as shown in FIG. 4, and the overlapping time T may be greater than 0 and less than the display charging period A (i.e., 0<T<A). In some embodiments, as shown in FIG. 4 and FIG. 5, the display driving circuit 110 may provide the synchronization signal Sy to the backlight driving circuit 210 before the display charging period A ends, so that the backlight module 200 starts to operate and enters the backlight driving period C, but not limited herein. In some embodiments, in one frame F, the display driving circuit 110 may provide the synchronization signal Sy to the backlight driving circuit 210 after the liquid crystals corresponding to at least the first region (i.e., the pixel region 1221) of the plurality of pixel regions 122 completely rotate and a predetermined time Tp has elapsed, wherein the predetermined time Tp may be greater than 0 and less than a frame time (i.e., 0<Tp<one frame time), or 0<Tp<½ frame time, 0<Tp<¼ frame time, 0<Tp<⅛ frame time or 0<Tp<1/16 frame time, but not limited herein.

According to the embodiment shown in FIG. 4 and FIG. 5, the display driving circuit 110 or the backlight driving circuit 210 is capable of providing a command with a constant driving frequency (e.g., the scan rate) according to an operation state (e.g., the frame rate) of the display module 100, and the backlight module 200 may be operated in the backlight driving period C in one frame F or corresponding to one frame F according to this command with the constant driving frequency, so as to turn on the light-emitting elements 220 of the plurality of light-emitting regions 222 by regions. For example, one frame F may be 1/120 seconds when the frame rate of the display module 100 is 120 Hz, and the operation time (e.g., scan time) of each light-emitting region 222 of the backlight module 200 may be (1/120)/p seconds. That is to say, corresponding to one frame F, each of the sub-period C1 to the sub-period Cp of the backlight driving period C may be (1/120)/p seconds, but not limited herein.

Through the design of the electronic device ED of the above embodiment, a portion of the backlight driving period C of one frame F is overlapped with the display charging period A of the next frame F, so that the whole backlight driving period C may have a longer time, thereby reducing the instantaneous current when the backlight module 200 is driven and reducing the power consumption. Furthermore, the backlight driving period C may be staggered from the liquid crystal rotating period B, thereby reducing the problems such as image persistence or rough edges of the images, so that the image display quality is improved. Therefore, the advantage of balancing the power consumption and the visual effect of displaying of the electronic device ED may be achieved.

Some embodiments of the electronic devices of the present disclosure will be detailed in the following. In order to simplify the illustration, the same elements in the following would be labeled with the same symbols. The differences between different embodiments are described in detail below, and the same features would not be described redundantly.

Figure 6:
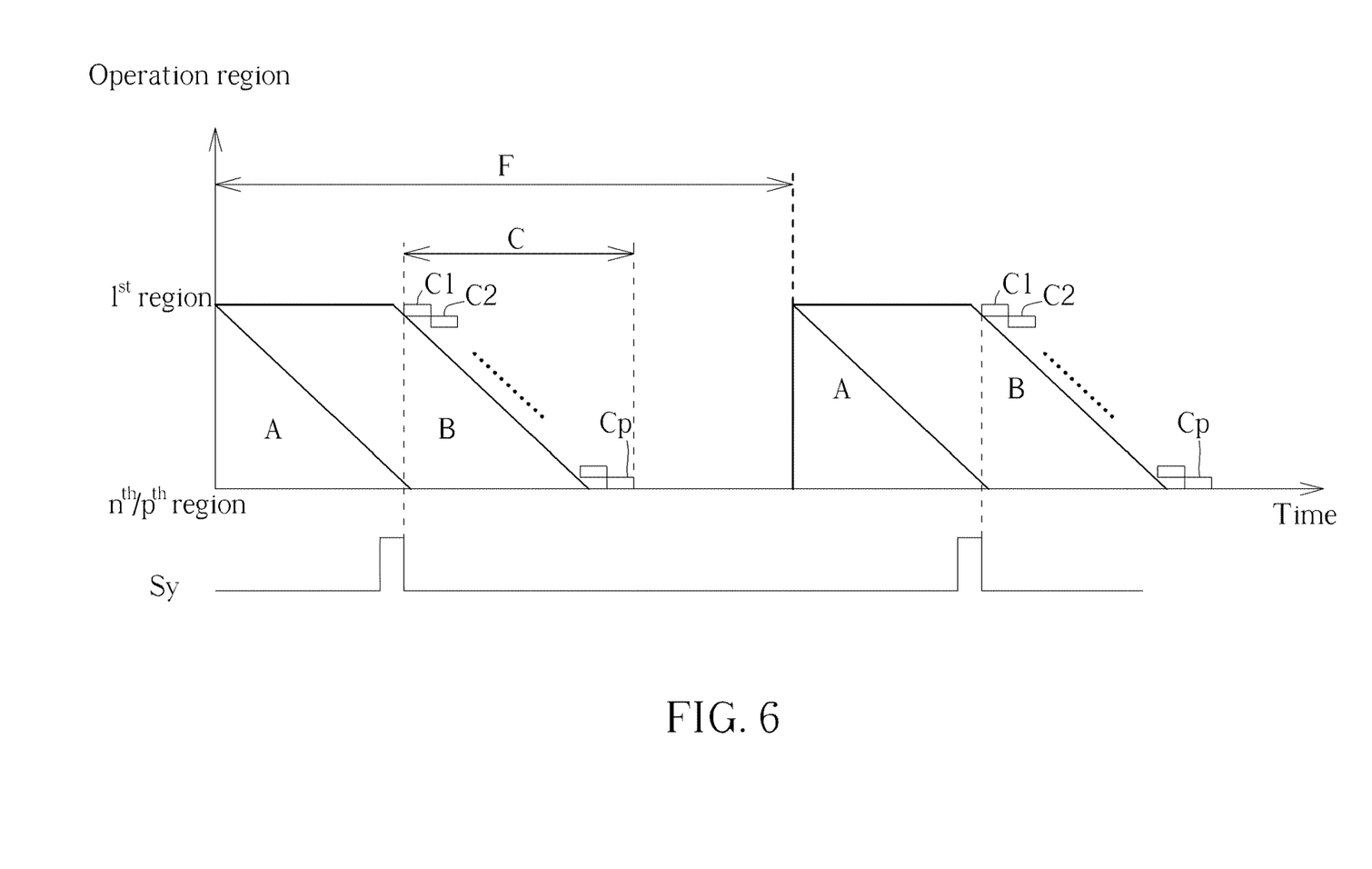
FIG. 6 is a timing diagram of driving of an electronic device according to a second embodiment of the present disclosure.

Please refer to FIG. 6, accompanied with FIG. 1 and FIG. 2. FIG. 6 is a timing diagram of driving of an electronic device according to a second embodiment of the present disclosure. The embodiment shown in FIG. 6 is different from the embodiment shown in FIG. 4 in that the display module 100 may have a variable frame rate. For example, the frame rate may be 90 Hz to 120 Hz, but the backlight module 200 is operated according to a command of a constant driving frequency, that is, the backlight driving period C may be maintained for a constant time in the condition that the time of one frame F is variable. As shown in FIG. 6, when the frame rate of the display module 100 is changed from 120 Hz to 90 Hz, one frame F may be 1/90 second, but the operation time of each light-emitting region 222 of the backlight module 200 is still (1/120)/p seconds. That is to say, corresponding to one frame F, each of the sub-period C1 to the sub-period Cp of the backlight driving period C is (1/120)/p seconds, and the operation time of each light-emitting region 222 of the backlight module 200 is still maintained for (1/120)/p seconds when the frame rate of the display module 100 is 120 Hz (1/120 seconds for one frame F) or f Hz (1/f seconds for one frame F). In this embodiment, the range of the variable frame rate and the frequency of the backlight driving period C are only examples, and are not limited to the above.

Figure 7:
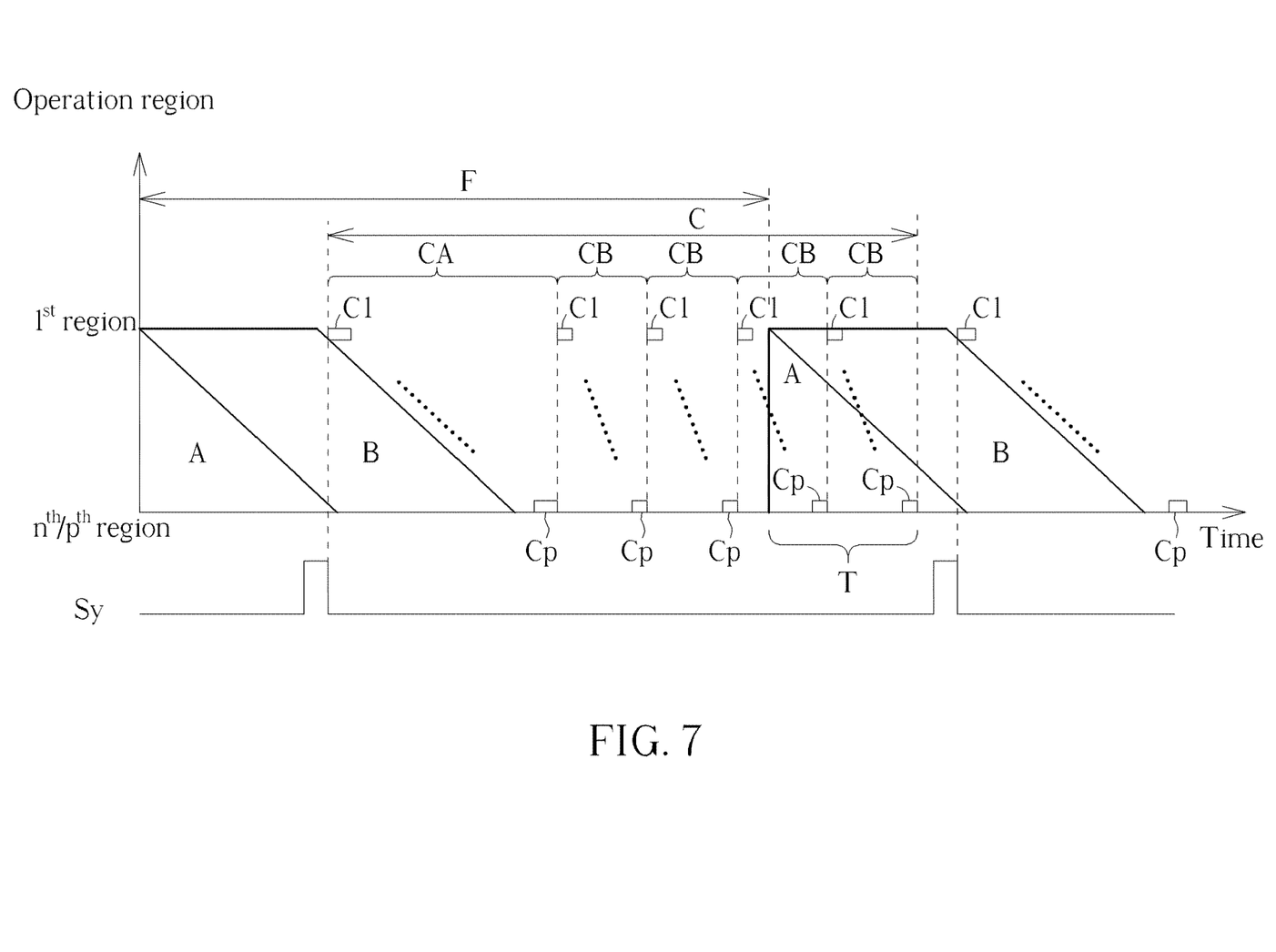
FIG. 7 is a timing diagram of driving of an electronic device according to a third embodiment of the present disclosure.

Please refer to FIG. 7, accompanied with FIG. 1 and FIG. 2. FIG. 7 is a timing diagram of driving of an electronic device according to a third embodiment of the present disclosure. As shown in FIG. 7, the backlight driving period C may include a first driving period CA and a second driving period CB which correspond to one frame F of the display module 100. The backlight module 200 is driven with a first frequency in the first driving period CA, the backlight module 200 is driven with a second frequency in the second driving period CB, and the first frequency is different from the second frequency. Specifically, the backlight module 200 may start to operate and enter the backlight driving period C including a first driving period CA and a plurality of second driving periods CB when the backlight driving circuit 210 receives the synchronization signal Sy. Furthermore, the backlight module 200 may be operated with the first frequency in the first driving period CA when the display driving circuit 110 provides a first command to the backlight driving circuit 210, or when the backlight driving circuit 210 provides a first command. That is to say, the light-emitting elements 220 in the light-emitting region 2221 to the light-emitting region 222p are correspondingly turned on by regions with the first frequency in the sub-period C1 to sub-period Cp of the first driving period CA. For example, the backlight module 200 is operated with 120 Hz in the first driving period CA, so that each of the sub-period C1 to the sub-period Cp of the first driving period CA may be ($1/120$)/p seconds, but not limited herein. The backlight module 200 may be operated with a second frequency in each of the second driving periods CB when the backlight driving circuit 210 provides a second command to the backlight driving circuit 210, or when the display driving circuit 110 provides a second command to the backlight driving circuit 210. That is to say, the light-emitting elements 220 in the light-emitting region 2221 to the light-emitting region 222p are correspondingly turned on by regions with the second frequency in the sub-period C1 to sub-period Cp of the second driving period CB, and repeated many times. For example, each of the sub-period C1 to sub-period Cp of the second driving period CB may be set as a unit time of x1 (seconds), and the backlight driving period C may include second driving periods CB with a number of k1, so that the sum of all the sub-periods C1 (or the sub-periods C2, sub-periods C3, . . . or sub-periods Cp) of the second driving periods CB may be k1*x1 seconds. Therefore, the sum of all the sub-periods C1 of the first driving period CA and the second driving periods CB in the backlight driving period C may be (($1/120$)/p)+k1*x1 seconds. In other words, corresponding to one frame F, the operation time (e.g., scan time) of each light-emitting region 222 of the backlight module 200 may be (($1/120$)/p)+k1*x1 seconds.

The first frequency and the second frequency may be set by the display driving circuit 110 or the backlight driving circuit 210 according to the operation state (e.g., the frame rate) of the display module 100. For example, one frame F is $1/90$ seconds when the frame rate of the display module 100 is 90 Hz, and the first driving period CA is $1/120$ seconds if the first frequency is set as 120 Hz, so that the backlight module 200 may be operated in a plurality of second driving periods CB for about ($1/90$-$1/120$) seconds. Therefore, if the number of the sub-periods in one second driving period CB is p, and each of the sub-period C1 to the sub-period Cp of the second driving period CB is set as a unit time of x1 (seconds), and the backlight driving period C includes second driving periods CB with a number of k1, the condition that x1*p*k1 is approximately equal to ($1/90$-$1/120$) seconds should be satisfied, that is, (x1*p*k1)≈($1/90$-$1/120$). According to the above condition, the unit time x1 and the second frequency may be set.

According to the embodiment shown in FIG. 7, a portion of the backlight driving period C corresponding to one frame F may be overlapped with the display charging period A of the next frame F. For example, one or more (i.e., at least one) of the plurality of second driving periods CB may be overlapped with the display charging period A of the next frame F by an overlapping time T, wherein the overlapping time T may be greater than 0 and less than the display charging period A. In addition, a portion of the backlight driving period C corresponding to one frame F may further be overlapped with the liquid crystal rotating period B of the next frame F. For example, the last second driving period CB may be overlapped with the liquid crystal rotating period B of the next frame F, but not limited herein. In some embodiments, the portion of the backlight driving period C overlapped with the liquid crystal rotating period B may be, for example, less than 5% of the liquid crystal rotating period B, so as to reduce the influence on the image display quality, but not limited herein. Through the design of the backlight module 200 driven with variable frequency of multi-section as shown in FIG. 7, the backlight module 200 may be operated according to the commands, and the stability of brightness of the electronic device ED may be improved when the display module 100 has different frame rates or variable frame rates.

Figure 8:
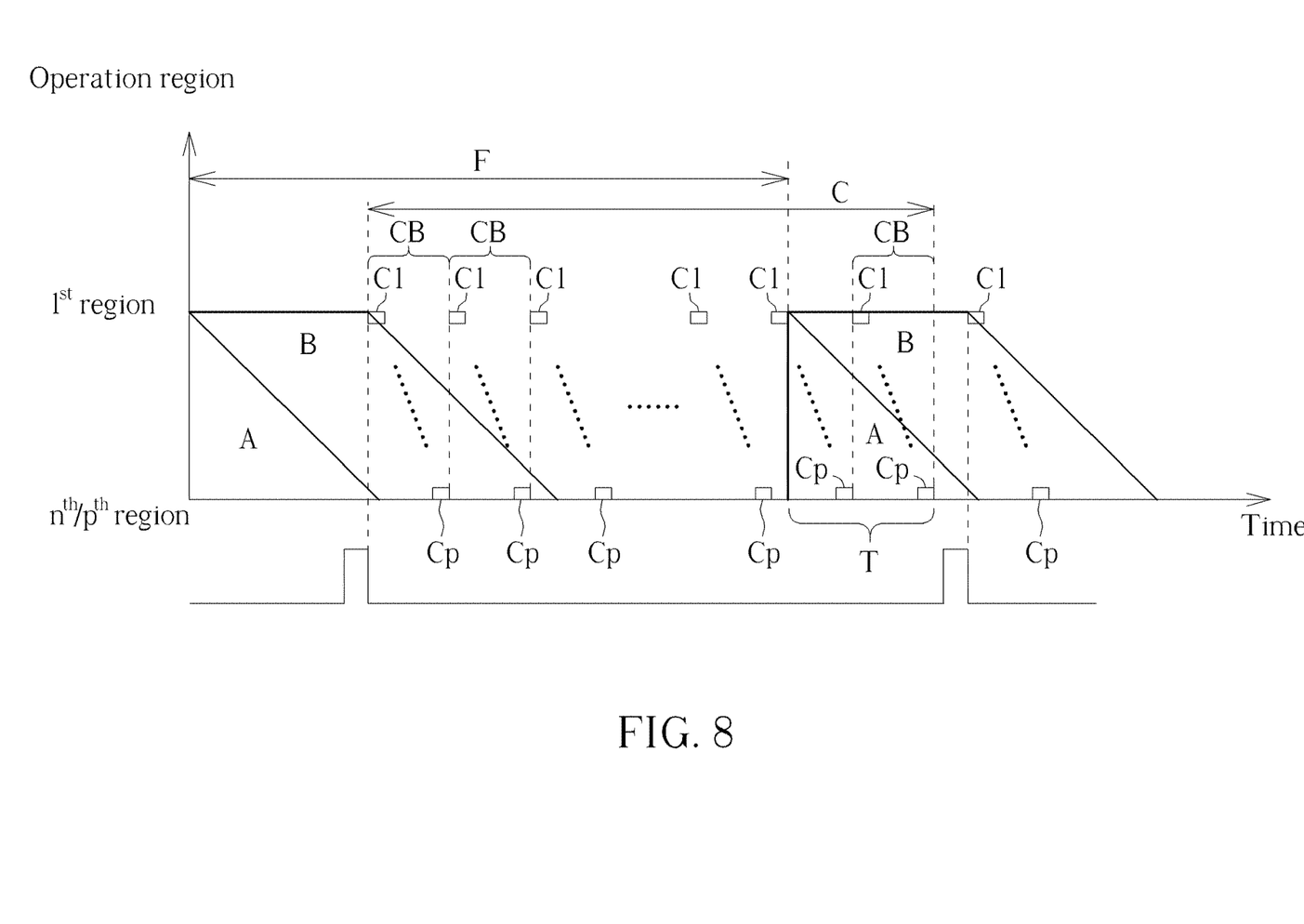
FIG. 8 is a timing diagram of driving of an electronic device according to a fourth embodiment of the present disclosure.

Please refer to FIG. 8, accompanied with FIG. 1 and FIG. 2. FIG. 8 is a timing diagram of driving of an electronic device according to a fourth embodiment of the present disclosure. As shown in FIG. 8, in one frame F of the display module 100 or corresponding to one frame F of the display module 100, the backlight module 200 may be operated only with a second frequency in the second driving period CB. The second frequency may be, for example, different from the frame rate of the display module 100 or the scan rate of the display module 100, but not limited herein. Specifically, the backlight module 200 may start to operate and enter the backlight driving period C including a plurality of second driving periods CB when the backlight driving circuit 210 receives the synchronization signal Sy. Furthermore, the backlight module 200 may be operated with the second frequency in each of the second driving periods CB when the backlight driving circuit 210 provides a second command to the backlight driving circuit 210, or when the display driving circuit 110 provides a second command to the backlight driving circuit 210. That is to say, the light-emitting elements 220 in the light-emitting region 2221 to the light-emitting region 222p are correspondingly turned on by regions with the second frequency in the sub-period C1 to sub-period Cp of the second driving period CB, and repeated many times. For example, each of the sub-period C1 to sub-period Cp of the second driving period CB may be set as a unit time of x2 (seconds), and the backlight driving period C may include second driving periods CB with a number of k2. Therefore, the sum of all the sub-periods C1 (or the sub-periods C2, sub-periods C3, . . . or sub-periods Cp) of the second driving periods CB may be k2*x2 seconds. In other words, corresponding to one frame F, the operation time (e.g., scan time) of each light-emitting region 222 of the backlight module 200 may be k2*x2 seconds.

The second frequency may be set by the display driving circuit 110 or the backlight driving circuit 210 according to the operation state (e.g., the frame rate) of the display module 100. For example, one frame F is $1/90$ seconds when the frame rate of the display module 100 is 90 Hz. Therefore, if the number of the sub-periods in one second driving period CB is p, and each of the sub-period C1 to the sub-period Cp of the second driving period CB is set as a unit time of x2 (seconds), and the backlight driving period C includes second driving periods CB with a number of k2, the condition that x2*p*k2 is approximately equal to $1/90$ seconds should be satisfied, that is, (x2*p*k2)≈$1/90$. According to the above condition, the unit time x2 and the second frequency may be set.

According to the embodiment shown in FIG. 8, a portion of the backlight driving period C corresponding to one frame F may be overlapped with the display charging period A of the next frame F. For example, one or more (i.e., at least one) of the plurality of second driving periods CB may be overlapped with the display charging period A of the next frame F by an overlapping time T, wherein the overlapping time T may be greater than 0 and less than the display charging period A. In addition, a portion of the backlight driving period C corresponding to one frame F may further be overlapped with the liquid crystal rotating period B of this frame F and the liquid crystal rotating period B of the next frame F. For example, the first second driving period CB and the second second driving period CB may be overlapped with the liquid crystal rotating period B of the corresponding frame F, and the last second driving period CB may be overlapped with the liquid crystal rotating period B of the next frame F, but not limited herein. In some embodiments, the portion of the backlight driving period C overlapped with the liquid crystal rotating period B may be, for example, less than 5% of the liquid crystal rotating period B, so as to reduce the influence on the image display quality, but not limited herein. Through the design of the backlight module 200 driven with higher frequency as shown in FIG. 8, the stability of brightness of the electronic device ED may be improved.

Figure 9:
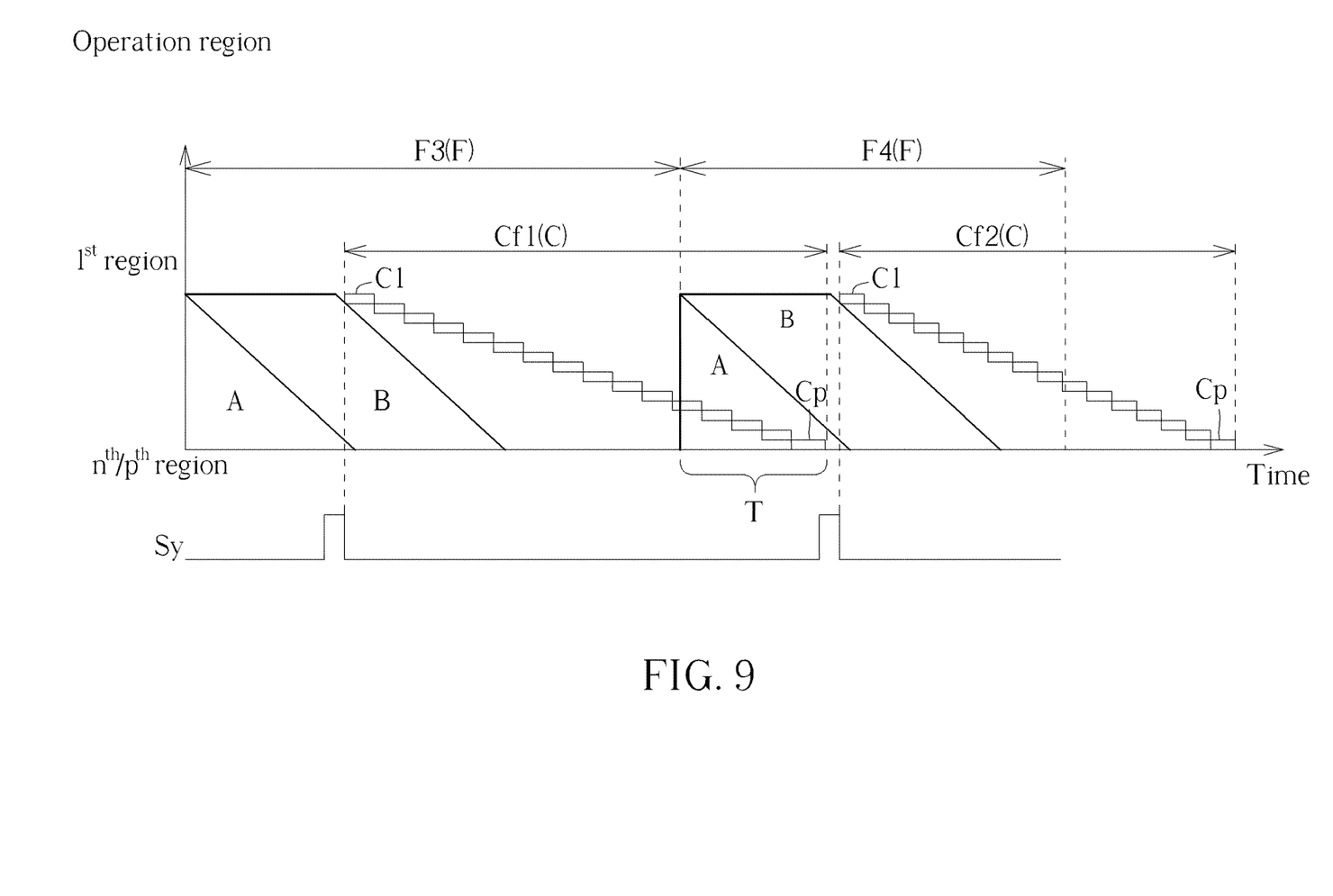
FIG. 9 is a timing diagram of driving of an electronic device according to a fifth embodiment of the present disclosure.

Please refer to FIG. 9, accompanied with FIG. 1 and FIG. 2. FIG. 9 is a timing diagram of driving of an electronic device according to a fifth embodiment of the present disclosure. According to the embodiment shown in FIG. 9, the display driving circuit 110 may be capable of providing commands with different driving frequencies according to the operation state of the display module 100, and the backlight module 200 may be operated in the backlight driving period C in one frame F or corresponding to one frame F according to the commands with different driving frequencies. Alternatively, the backlight driving circuit 210 may be capable of providing commands with different driving frequencies according to the operation state of the display module 100, and the backlight module 200 may be operated in the backlight driving period C in one frame F or corresponding to one frame F according to the commands with different driving frequencies. Specifically, the backlight module 200 may start to operate and enter the backlight driving period C when the backlight driving circuit 210 receives the synchronization signal Sy. Furthermore, the display driving circuit 110 or the backlight driving circuit 210 may provide a command with a driving frequency of f Hz when the frame rate of the display module 100 is f Hz (e.g., 60, 90 or 120 Hz, but not limited herein), so that the backlight module 200 may be operated in the backlight driving period C corresponding to one frame F with the driving frequency of f Hz. Therefore, each of the sub-period C1 to sub-period Cp of the backlight driving period C may be $(1/f)/p$ seconds, but not limited herein.

For example, as shown in FIG. 9, the display module 100 may have a variable frame rate. Corresponding to one frame F3, the display driving circuit 110 or the backlight driving circuit 210 may provide a command with a driving frequency of 90 Hz when the frame rate of the display module 100 is 90 Hz, so that the backlight module 200 is operated in a backlight driving period Cf1 with the driving frequency of 90 Hz, and thus each of the sub-period C1 to sub-period Cp of the backlight driving period Cf1 may be $(1/90)/p$ seconds. Corresponding to the next frame F4, the display driving circuit 110 or the backlight driving circuit 210 may provide a command with a driving frequency of 120 Hz when the frame rate of the display module 100 is 120 Hz, so that the backlight module 200 is operated in a backlight driving period Cf2 with the driving frequency of 120 Hz, and thus each of the sub-period C1 to sub-period Cp of the backlight driving period Cf2 may be $(1/120)/p$ seconds. However, the frame rate of the display module 100 and the corresponding driving frequency of the backlight module 200 in the present disclosure are not limited to the above.

According to the embodiment shown in FIG. 9, a portion of the backlight driving period Cf1 corresponding to one frame F3 may be overlapped with the display charging period A of the next frame F4 by an overlapping time T, wherein the overlapping time T may be greater than 0 and less than the display charging period A. Furthermore, the backlight driving period Cf1 can avoid the liquid crystal rotating period B, thereby reducing the power consumption of the electronic device ED and improving the image display quality. In addition, the driving frequency of the backlight module 200 may be adjusted to reduce or increase according to the operation state of the display module 100, so as to reduce the overlap between the backlight driving period C and the liquid crystal rotating period B, and the visual effect of displaying of the electronic device ED is further improved.

From the above description, according to the electronic devices of the embodiments of the present disclosure, a portion of the backlight driving period corresponding to one frame is overlapped with the display charging period of the next frame through the cooperation of the display module and the backlight module, which may reduce the power consumption. Furthermore, the image display quality may be improved by reducing the overlap between the backlight driving period and the liquid crystal rotating period, and thus the advantage of balancing the power consumption and the visual effect of displaying of the electronic device may be achieved. In addition, the backlight module may be correspondingly operated with different driving frequencies according to different commands, thereby improving the stability of brightness of the electronic device and/or further improving the visual effect of displaying.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a display module comprising a display charging period and a liquid crystal rotating period in one frame; and
   a backlight module configured to provide a light source to the display module, wherein the backlight module comprises a backlight driving period corresponding to one frame of the display module,
   wherein a portion of the backlight driving period of an $N^{th}$ frame is overlapped with the display charging period of an $(N+1)^{th}$ frame, and N is a positive integer,
   wherein the backlight driving period comprises a first driving period and at least one second driving period which correspond to one frame of the display module, wherein the backlight module is driven with a first frequency in the first driving period, the backlight module is driven with a second frequency in the second driving period, and the first frequency is different from the second frequency.

2. The electronic device according to claim 1, wherein the display module comprises a display driving circuit, the backlight module comprises a backlight driving circuit, and the display driving circuit provides a synchronization signal to the backlight driving circuit.

3. The electronic device according to claim 2, wherein the display driving circuit provides the synchronization signal to the backlight driving circuit before the display charging period ends.

4. The electronic device according to claim 2, wherein the display module comprises a plurality of pixel regions, and liquid crystals corresponding to the plurality of pixel regions rotate during the liquid crystal rotating period, wherein in one frame, the display driving circuit provides the synchronization signal to the backlight driving circuit after the liquid crystals corresponding to at least a first region of the plurality of pixel regions completely rotate and a predetermined time has elapsed, wherein the predetermined time is greater than 0 and less than a frame time.

5. The electronic device according to claim 1, wherein the backlight driving period corresponds to 5% to 100% of one frame.

6. The electronic device according to claim 1, wherein the portion of the backlight driving period of the $N^{th}$ frame is overlapped with the display charging period of the $(N+1)^{th}$ frame by an overlapping time, and the overlapping time is greater than 0 and less than the display charging period of the $(N+1)^{th}$ frame.

7. The electronic device according to claim 1, wherein the backlight driving period comprises the first driving period and a plurality of second driving periods which correspond to one frame of the display module, wherein the backlight module is driven with the second frequency in each of the plurality of second driving periods, wherein at least one of the plurality of second driving periods of the $N^{th}$ frame is overlapped with the display charging period of the $(N+1)^{th}$ frame.

8. The electronic device according to claim 7, wherein a portion of the backlight driving period of the Nun frame is overlapped with the liquid crystal rotating period of the $(N+1)^{th}$ frame.

9. The electronic device according to claim 8, the portion of the backlight driving period of the $N^{th}$ frame overlapped with the liquid crystal rotating period of the $(N+1)^{th}$ frame is less than 5% of the liquid crystal rotating period of the $(N+1)^{th}$ frame.

10. An electronic device, comprising:
a display module comprising a display charging period and a liquid crystal rotating period in one frame; and
a backlight module configured to provide a light source to the display module, wherein the backlight module comprises a backlight driving period corresponding to one frame of the display module,
wherein a portion of the backlight driving period of an Nun frame is overlapped with the display charging period of an $(N+1)^{th}$ frame, and N is a positive integer,
wherein the display module comprises a display driving circuit, and the backlight module comprises a backlight driving circuit, wherein the backlight module is operated with a first frequency in a first driving period when the display driving circuit provides a first command to the backlight driving circuit, and the backlight module is operated with a second frequency in a second driving period when the backlight driving circuit provides a second command to the backlight driving circuit.

11. The electronic device according to claim 10, wherein the first driving period and the second driving period of the backlight module correspond to one frame of the display module.

12. The electronic device according to claim 10, wherein in one frame of the display module, the backlight module is operated only with the second frequency in the second driving period.

13. An electronic device, comprising:
a display module comprising a display charging period and a liquid crystal rotating period in one frame; and
a backlight module configured to provide a light source to the display module, wherein the backlight module comprises a backlight driving period corresponding to one frame of the display module,
wherein a portion of the backlight driving period of an Nun frame is overlapped with the display charging period of an $(N+1)^{th}$ frame, and N is a positive integer,
wherein the display module comprises a display driving circuit, the display driving circuit is capable of providing commands with different driving frequencies according to an operation state of the display module, and the backlight module is operated in the backlight driving period in one frame according to the commands with different driving frequencies.

* * * * *